US010877940B2

(12) United States Patent
Patterson, III et al.

(10) Patent No.: US 10,877,940 B2
(45) Date of Patent: *Dec. 29, 2020

(54) DATA STORAGE WITH A DISTRIBUTED VIRTUAL ARRAY

(71) Applicant: VMware, Inc., Palo Alto, CA (US)

(72) Inventors: R. Hugo Patterson, III, Los Altos, CA (US); Brian Biles, San Carlos, CA (US); Boris Weissman, Palo Alto, CA (US); Sazzala Reddy, Los Altos, CA (US); Ganesh Venkitachalam, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,635

(22) Filed: Jan. 7, 2019

(65) Prior Publication Data

US 2019/0138504 A1 May 9, 2019

Related U.S. Application Data

(63) Continuation of application No. 14/710,541, filed on May 12, 2015, now Pat. No. 10,180,948, which is a
(Continued)

(51) Int. Cl.
*G06F 16/18* (2019.01)
*G06F 16/182* (2019.01)
(Continued)

(52) U.S. Cl.
CPC .......... *G06F 16/1827* (2019.01); *G06F 3/064* (2013.01); *G06F 3/067* (2013.01);
(Continued)

(58) Field of Classification Search
CPC .... G06F 16/1827; G06F 16/11; G06F 3/0613; G06F 3/0614; G06F 3/064; G06F 3/067
See application file for complete search history.

(56) References Cited

U.S. PATENT DOCUMENTS 6,704,730 B2 3/2004 Moulton et al.
7,373,464 B2 5/2008 Zhu et al.
(Continued)

OTHER PUBLICATIONS

Welch et al., "Scalable Performance of the Panasas Parallel File System", 6th USENIX Conference on File and Storage Technologies, dated Feb. 26-29, 2008, 37 pages.
(Continued)

*Primary Examiner* — Ryan Bertram
(74) *Attorney, Agent, or Firm* — Fish & Richardson P.C.

(57) ABSTRACT

A data storage system includes a plurality of hosts, each of which includes at least one processor and communicates over a network with a plurality of storage nodes, at least one of which has at least one storage device, at least one storage controller, and at least one non-volatile memory. At least one process within a host issues data storage read/write requests. At least one of the hosts has a cache for caching data stored in at least one of the plurality of storage nodes. The host writes data corresponding to a write request to at least one remote non-volatile memory and carries out at least one storage processing function; data in the written-to node may then be made available for subsequent reading by a different one of the hosts. Examples of the storage processing function include compression, ECC computation, deduplicating, garbage collection, write logging, reconstruction, rebalancing, and scrubbing.

19 Claims, 4 Drawing Sheets

Related U.S. Application Data continuation-in-part of application No. 13/998,531, filed on Nov. 7, 2013, now Pat. No. 10,140,136.

(51) Int. Cl.
| | |
|---|---|
| *G06F 11/14* | (2006.01) |
| *G06F 16/11* | (2019.01) |
| *G06F 11/10* | (2006.01) |
| *G06F 3/06* | (2006.01) |
| *G06F 9/50* | (2006.01) |

(52) U.S. Cl.
CPC .......... *G06F 3/0613* (2013.01); *G06F 3/0614* (2013.01); *G06F 9/50* (2013.01); *G06F 11/1076* (2013.01); *G06F 11/1402* (2013.01); *G06F 11/1448* (2013.01); *G06F 16/11* (2019.01); *G06F 3/0656* (2013.01); *G06F 2211/1009* (2013.01); *G06F 2211/1028* (2013.01); *G06F 2211/1088* (2013.01)

(56) References Cited

U.S. PATENT DOCUMENTS

| | | | |
|---|---|---|---|
| 7,434,015 | B2 | 10/2008 | Zhu et al. |
| 8,285,918 | B2 | 10/2012 | Maheshwari |
| 8,386,838 | B1 | 2/2013 | Byan |
| 8,601,473 | B1 | 12/2013 | Aron |
| 2005/0177770 | A1 | 8/2005 | Coatney et al. |
| 2006/0161810 | A1 | 7/2006 | Bao |
| 2006/0218360 | A1 | 9/2006 | Burkey |
| 2009/0113420 | A1 | 4/2009 | Pawlowksi |
| 2009/0204769 | A1 | 8/2009 | Heil et al. |
| 2009/0204846 | A1 | 8/2009 | Baloun et al. |
| 2009/0292861 | A1 | 11/2009 | Kanevsky et al. |
| 2010/0106933 | A1 | 4/2010 | Kamila et al. |
| 2014/0047263 | A1 | 2/2014 | Coatney |
| 2014/0208024 | A1 | 7/2014 | Simionescu et al. |
| 2014/0310332 | A1 | 10/2014 | Huang et al. |
| 2014/0380307 | A1 | 12/2014 | Zhu et al. |

OTHER PUBLICATIONS

Thekkath et al., "Frangipani: A Scalable Distributed File System", SIGOPS Oper. System. Rev 31, 5, dated Oct. 1997, pp. 224-237.

Miranda et al., "Reliable and Randomized Data Distribution Strategies for Large Scale Storage Systems", HIPC, Proceedings of the 2011 18 International Con. on High Performance Computing, pp. 1-10.

Lee et al., "Petal:Distributed Virtual Disks", Proceedings of the 7th International Conference on Architectural Support for Programming Languages and Operatings Systems, dated 1996, pp. 84-92.

Dewaikar, Mayur, "Symantec NetBackup PureDisk Optimizing Backups with Deduplication for Remote Offices, Data Center and Virtual Machines", dated 2009, 14 pages.

Denneman, Frank, "Understanding the I/O Path of a Storage Acceleration Solution", PernixData Online Whitepaper, dated Jun. 10, 2015, 5 pages.

Author Unknown, "What's New: Vmware Virtual SAN 6.0", Vmware Storage Business Unit Documentation v1.0 dated Feb. 2015, 7 pages.

Author Unknown, "The Seagate Kinetic Open Storage Vision", Web Page Description on Jun. 10, 2015 from http://www.seagate.com/tech-insights/kinetic-vision-how-seagate-new-developer, 10 pages.

Author Unknown, "Nutanix Complete Cluster", Nutanix Online White Paper Download from Jun. 6, 2015, 2 pages.

Byan et al., "Mercury: Host-side Flash Caching for the Data Center", Apr. 20, 2012 , 85 pages.

Eisler et al., "Data ONTAP GK: A Scalable Storage Cluste", FAST '07: 5th USENIX Conference on File and Storage Technologies, http:// static.usen ix.org/event/fasto7/tech/full_papers/eisler/eisler.pdf.

DellEMC.com, "EMC Isilon OneFS Operating System, Powering the Isilon Scale-Out Storage Platform," Dec. 2013, retrieved from URL http:/, www.emc.com/collateral/hardware/white-papers/h8202-isilon-onefs-wp.pdf, 16 pages.

Lee et al., "Petal: Distributed Virtual Disks", Proceedings of the 7th International Conference on Architectural SIGOPS Oper. Syst.. Rev. , Sep. 1996, 84-92.

Oehme et al., "IBM Scale out File Services: Reinventing Network-Attached Storage", Jul./Sep. 2008, http:// www-935.ibm.com/services/us/its/pdf/sofs-am-journal-final-070108.pdf.

Patterson et al., "A Case for Redundant Arrays of Inexpensive Disks (RAID)", Computer Science Division, University of California, Jun. 1988, 109-16.

Schindler et al., "From Server-Side to lost-Side: Flash Memory for Enterprise Storage" NepApp, May 9, 2012, 31 pages.

DATA STORAGE WITH A DISTRIBUTED VIRTUAL ARRAY

CROSS-REFERENCE TO RELATED APPLICATIONS

This application claims priority as a Continuation of U.S. patent application Ser. No. 14/710,541, filed May 12, 2015, now U.S. Pat. No. 10,180,948, which claims priority and is a Continuation-in-Part of U.S. patent application Ser. No. 13/998,531, filed Nov. 7, 2013, now U.S. Pat. No. 10,140,136, the contents of which are incorporated by reference. The applicant(s) hereby rescind any disclaimer of claim scope in the parent application(s) or the prosecution history thereof and advise the USPTO that the claims in this application may be broader than any claim in the parent application(s).

FIELD OF THE INVENTION

This invention relates to distributed data storage systems.

BACKGROUND

The need for efficient storage systems and methods for massive amounts of data continues to grow. Currently, large data centers commonly employ blade servers that access a traditional storage system that includes scalable arrangements of physical shelves of memory devices (disks and/or flash) and storage controllers. Typically, the servers access the storage controllers over a network (Internet, local area network (LAN), storage area network (SAN), etc.), while the storage controllers communicate among themselves via a private backplane and communicate with shelves via fibre channel or serial-attached SCSI. The servers generally host applications or virtual machines (VMs), which allow for dynamic allocation of hardware resources, and have become a characteristic of modern data centers.

These traditional storage systems recently have been taking on an increasing variety of compute-intensive storage processing functions that now include: SHA-1 fingerprinting to support deduplication, compressing data to save storage capacity, encrypting data for security, replicating data for disaster recovery, computing erasure codes for RAID, computing checksums to ensure data integrity, garbage collection in log-structured file systems, managing multiple tiers of memory devices (e.g. RAM, flash and disk) including migrating data among the tiers to maximize performance, and maintaining complex data structures to support snapshots, rapid cloning, and thin-provisioning. To support these increasing loads, storage controllers have become ever more powerful, with more numerous and more powerful CPUs and larger amounts of RAM, to the point that the storage controllers are sometimes more powerful, and expensive, than the compute servers themselves.

A common characteristic of traditional storage systems is that they include a non-volatile memory in some form to address the problem of the high write latency of many persistent storage devices such as disk drives. The compute-intensive storage processing mentioned above can further increase write latency if it must be performed before the write data are written in processed form to the persistent storage devices. This non-volatile memory allows the storage system to acknowledge a new write as "safe" even before all the processing has occurred or before the data or the processed data has been written to the persistent storage devices. In traditional storage systems, the non-volatile memory is transparent to the servers writing the data. The compute servers write data to the storage system, the storage system buffers the data in non-volatile memory and acknowledges the write to the server. In the background, the storage system may do storage processing of the data and write the data to a persistent storage device without the compute server performing any additional operation on the data. Typically, compute servers do not include such non-volatile memory.

The compute servers typically share the resources of these traditional storage systems, including the capacity and performance of the memory devices as well as the storage processing capabilities the storage controllers. One disadvantage of this configuration is the slowdowns caused by contention for the shared resources. For example, assume that data is to be stored compressed, deduped with an associated, computed fingerprint, and encrypted. If the required computations are to be done within a storage controller, then performing the necessary computations for one server may cause an unacceptable or at least undesirable delay in servicing the requests from other servers. Such contention is not easy to detect or manage, which makes it difficult if not impossible to guarantee performance and any particular workload. One obvious way to reduce this risk of overloading of the computation resource in the nodes is to increase their computational power. Especially given that there may be many storage controllers, this approach is not only expensive, but also typically amounts to wasteful over-provisioning for most normal storage operations. Further, if the storage controllers are found to be underpowered, replacing them with a more powerful model can be expensive and require down time during the replacement or even require the migration of all data to a completely new storage system, causing significant disruption and typically taking weeks or months to complete.

Another characteristic of modern data centers is the increased use of solid state drive (SSD) devices (e.g. Flash devices) for caching data at various points in the storage architecture to increase I/O operations per second (TOPS). While current, traditional storage architectures for VMs improve upon older designs, they retain some legacy characteristics that prevent these architectures from being optimally efficient, both in terms of cost and in terms of ease of use. For example, current storage systems must define an elaborate data storage structure (LUNs, Volumes, etc.). Some current systems also require a layer of software to translate multiple transfer protocols into one proprietary protocol (see for example, SpinNP, and NetApp).

In environments that include virtualized storage, one trend found today is away from traditional storage architectures and structures and towards what is known as "hyper-converged" architectures, in which physical memory devices and server computational resources are all included in a single physical unit. Some of the claimed advantages of this architecture are that it avoids the expense of dedicated storage controllers and that the processing power available for storage processing grows as more such combined units are added to the system. Another claimed advantage is greater control over provisioning in an environment with virtual servers, as well as enabling a management console that integrates information from multiple components into a unified display (sometimes referred to as "single pane of glass" management. Examples of hyper-converged storage products include "Virtual SAN" by VMware, Inc., "Omni-Cube" by SimpliVity Corp., "Atomic Unit" by Nimboxx, Inc., and the "Virtual Compute Platform" by Nutanix, Inc.

Hyper-convergence has disadvantages as well, however. First, when different host platforms are expected to access a common storage resource: If one host depends on another host to access its data, then performance will often depend on how busy the VMs on the other host are. Because of this "noisy neighbor problem", one particularly busy VM can degrade the performance of other VMs on the same host, and, if pooled, the noisiness may extend beyond the boundaries of that host to the whole pool. If needed data for a given VM is on another host, that VM may have to wait because it is being slowed down by a different VM on the hyper-converged host that includes the storage device that's needed. In short, the performance of a given VM may be constrained by other VMs on other hosts.

Another disadvantage of hyper-converged systems is that it is difficult to scale storage and compute resources independently. If the environment needs more storage capacity, it may be necessary to add a whole host with its included memory devices to the system even though the host's compute resources are not needed. Conversely, if more computing resources are needed, they will come with additional storage capacity whether or not it is needed.

What is needed is therefore a distributed storage system that provides both flexibility and scalability, that leverages the computational power of each server for storage processing and the high performance of local flash memory devices, and that also provides data sharing among all the servers in a group from an independently scalable pool of storage but minimizes inter-server coordination and communication to minimize the noisy-neighbor problem.

DETAILED DESCRIPTION

Figure 1:
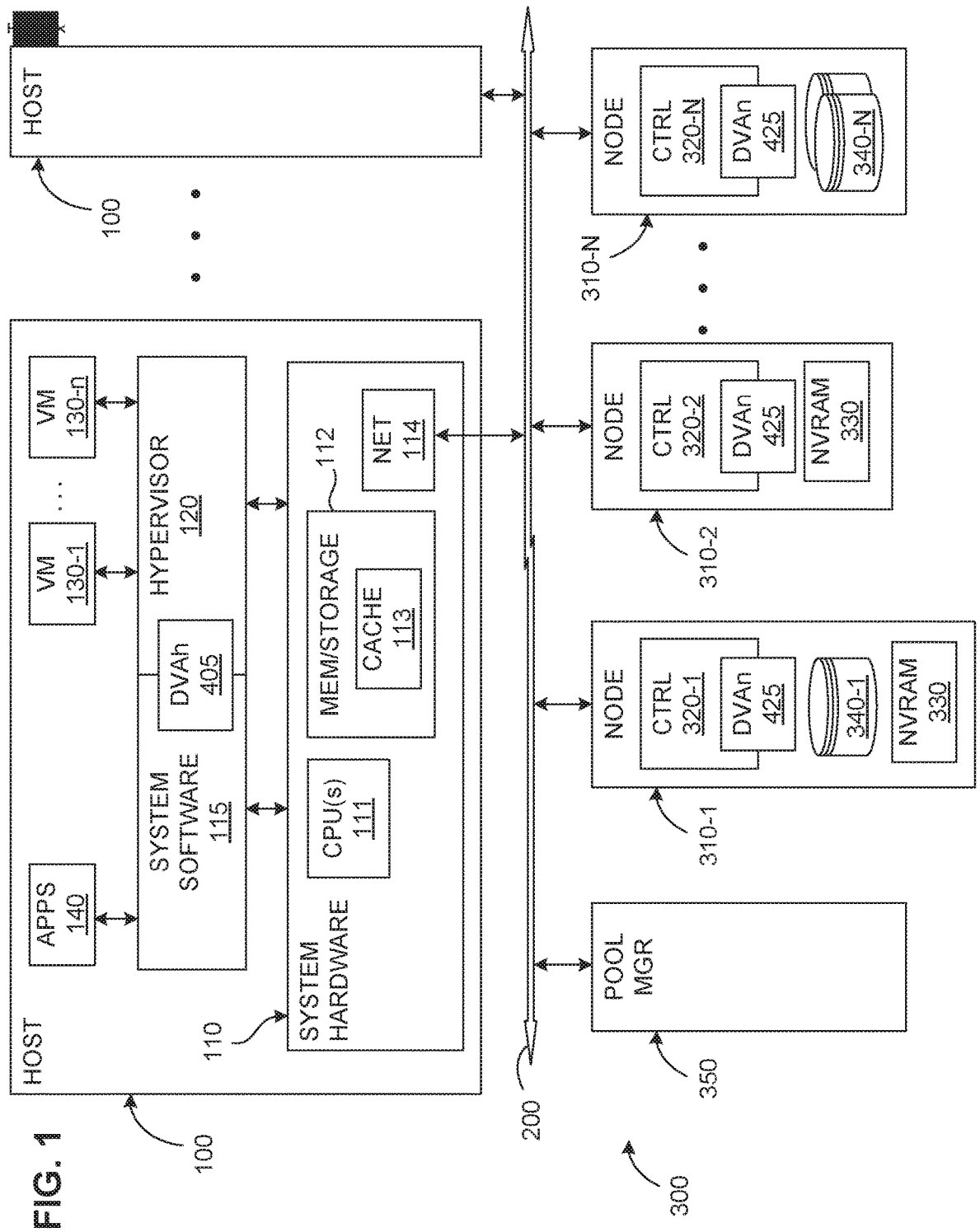
FIG. 1 illustrates the main components of a Distributed Virtual Array (DVA) system.

FIG. 1 shows a general embodiment of the invention and illustrates the relationship between two main physical "sides" of the DVA: any number (including one) of hosts 100, for example, servers, and a storage Pool 300, which includes storage nodes 310-1, 310-2, . . . , 310-N (collectively, "310"), which from the perspective of the hosts, may form a single yet distributed storage system. Entities within the hosts 100 write data that is first stored in non-volatile memory (shown as NVRAM 330) and ultimately stored in persistent storage devices 340-1, . . . , 340-N (collectively, "340") located in the nodes.

The reading and writing entities may be of any type, including virtual machines 130 (shown separately as "VM"s 130-1, . . . , 130-n) or more general, non-virtualized processes such as user-level applications 140. Software and hardware entities that need to read and/or write data are referred to here as "clients".

Each host includes system hardware 110, including one or more processors (CPUs) 111, and some device(s) 112 for non-persistent, volatile and/or persistent, non-volatile, non-transitory storage of data and/or code that may execute on the CPU(s). Traditionally, there is a relatively clear technical distinction between "memory" and "storage", since the former has typically comprised fast, volatile, solid-state devices, whereas the latter have generally comprised slower, non-volatile, mechanical or opto-mechanical devices. With the wide-spread use of modern technologies for bulk, persistent storage, however, this distinction is becoming increasingly less clear. For example, many modern servers use various solid-state storage devices (SSDs) such as "server flash" to increase throughput and speed, which is commonly measured in terms of IOPS (Input/Output Operations Per Second), especially for non-contiguous storage locations. Emerging technologies such as phase-change memory (PRAM) are further blurring the distinction. No specific type of host-side storage or memory technology is required to implement the embodiments described here, and it is not necessary for every host to employ the same storage technology.

The hardware 110 will include other conventional mechanisms such as a network connection device 114 for transfer of data between the various components of the system over one or more network(s) 200, which may be any known public or proprietary local or wide-area network such as the Internet, an internal enterprise network, etc. The only requirement is that, whatever network(s) is/are used, all clients are able to access the storage nodes (see below) they need to access. "The" network 200 is therefore to be read as the collection of whichever networks are implemented, along with any necessary switching or other communications devices if data needs to pass between different networks.

Each host will also include conventional system software 115 such as, depending on the implementation, an operating system (OS), device drivers, etc. In the illustrated configuration, one of the hosts 100 is shown as supporting a virtualization platform, which will typically include some form of hypervisor 120 or similar interface layer between the system hardware 110 and (in the illustrated embodiment) at least one virtual machine (VM) 130-1, . . . , 130-n. As is well known, VM is a software abstraction of an actual physical computer system.

The VMs are shown in FIG. 1 within the host merely for simplicity—in most implementations, a virtual machine is a "guest" that is running on the hypervisor/hardware host. In some virtualized systems, a "virtual machine monitor" is included as an interface to underlying software layers, such as the hypervisor or a host OS. Many hypervisors, such as the ESX Server family of products of VMware, Inc., run directly on "bare metal", that is, directly on the system hardware 110, with no need for interaction with a host OS. In other virtualization platforms, the hypervisor may run on or at the same level as the host OS, which supports and performs some operations upon calls from the hypervisor. The various embodiments of the invention described here are not dependent on any particular virtualization architecture, whether for the VMs, the hypervisor(s) or other virtualization layers. Indeed, VMs are not presupposed at all; rather, all that is assumed is some system software layer that processes data storage read/write requests from software and hardware entities ("clients"). A "host" is thus any platform on which processes (of which VMs are a special case) run that may wish to write data to and/or read data from the distributed storage arrangement described below.

Although the various storage nodes 310 in the pool 300 are shown as distinct units and may be different physical servers, they may be considered to lie within a single logical boundary for purposes of addressing. The logical, conceptual boundary of the addressable storage pool may, however, also include storage components and processes that extend beyond the illustrated set of physical storage nodes 310-1, 310-2, . . . , 310-N.

Depending on the desired DVA features, a Pool Manager 350 may also be included to handle some distribution and control functions for the nodes 310, to maintain administrative and other data common to the nodes 310, etc. Such a Pool Manager may run within one or more of the storage nodes, within one or more of the hosts, or in a separate computing system attached to the same network. Although they may also be implemented as independent entities, the Pool Manager may also include other managerial components, such as for managing a file name space for files (such as virtual disks) stored within the pool, for cluster management, and for other node-management functions.

Two of the many currently available examples of possible choices to implement a storage node could be a Xyratex chassis with multiple disk controllers, or a single-disk "FAWN" (Fast Array of Wimpy Nodes), which is a low-power server architecture for intensive input/output tasks. More generally, the nodes can be implemented using any form of computer that communicates with at least one disk over any form of bus or network connection. Indeed, a node could itself even be an entity that writes data to the storage pool.

Each node contains one or more storage controllers 320-1, 320-2, . . . , 320-N (collectively, 320) each of which comprises conventional processing circuitry to control one or more disks, flash or other SSD devices or other devices comprising the persistent storage devices 340 (which comprises more than one physical device). The controller also contains the circuitry necessary to connect to the network 200. In some embodiments, the controller may be integrated with the storage device in single composite module. As with the host 100, the various software components used within the nodes of the storage pool 300 will be loaded and/or stored in any conventional method so as to be executable on the processor(s) on each hardware platform within the pool; these media and processor(s) are not illustrated separately in the figures for the sake of simplicity—skilled programmers will of course know these will be present. So far, the system components described are also found in many prior art systems.

In the preferred embodiment, at least one of the controllers 320 also includes, or is able to access, some non-volatile memory 330 (NVRAM—FIG. 2) to receive and persistently store newly written data with very low latency. In some systems, the NVRAM may be on a special card in a PCIe slot. In some implementations, the controller may have a battery backup; on power failure, the controller will then have enough time to copy a portion of system memory to a flash drive. In this case, the NVRAM 330 need not be a separate physical component but may instead a logical portion of the general purpose RAM that will be within the controller for other, standard purposes. In some systems, the NVRAM may just be a low-latency SSD. Not all implementations of embodiments of the invention require nodes to have both disks and NVRAM; rather, any given node may be configured to have or at least be able to access only one of these two types of persistent storage devices. Thus, as FIG. 1 illustrates, it is possible to implement the system such that one or more nodes may have both persistent storage device(s) and non-volatile memory (node 310-1, for example), while one or more other nodes may not include the persistent storage device (node 310-2, for example), and still other node(s) may not have a non-volatile memory component 330 at all. As FIG. 1 also illustrates with node 310-N, it is possible to one or more nodes to have more than one persistent storage device (340-N). Moreover, in some embodiments, the NVRAM may be in a host.

In the preferred embodiment, the host is able to write data over the network specifically to the NVRAM in a storage node or host, distinct from writing to a persistent storage device, and may also give commands to remove data from said NVRAM. This in contrast to the configuration in traditional storage systems in which the NVRAM is a transparent buffer for data on its way to a persistent storage device.

As mentioned above, two dominant storage philosophies fall near different ends of the trade-off spectrum: In hyper-converged systems, substantially the entire storage and computation burden is concentrated within interdependent hosts, whereas in other systems, most of the computational load is placed on the remote storage units themselves and the hosts do not depend directly on each other. Embodiments of the invention employ a different approach, in which the usually greater computational resources of hosts are used for many storage-related functions, but used in a way that does not require significant inter-host communication and coordination, and in which the main storage capability remains primarily in the remote nodes where any host can access it without going through another host.

To this end, the hosts and the nodes include respective DVA components—a DVAh 405 module at the system software level, and DVAn 425 in the nodes. As FIG. 1 illustrates by overlapping, the DVAh 405 may be implemented as part of the system software 115, as part of the controlling software (such as the hypervisor 120) of the virtualization platform, or with cooperating components in both. Options include configuring the DVAh component as a driver within the system software 115, or within the hypervisor 120, with call-outs as needed to the host operating system (system software). It would also be possible to configure the DVAh 405 component within a different user- or system-level process, or even within a "helper" VM. Regardless of the configuration of the DVAh and DVAn, they will generally be implemented as corresponding bodies of processor-executable code that is stored in non-transitory storage and loaded into memory for execution by the host CPU(s) 111.

Similarly, the DVAn 425 components in the nodes may also be implemented as software running on the respective storage controllers 320, or as software modules separate from but coordinating with the storage controllers, and will also be implemented as corresponding bodies of processor-executable code that stored in non-transitory storage and loaded into memory for execution by the processor(s) in the nodes 310.

A cache 113 is preferably included in at least one host, preferably as part of the memory/storage component(s) 112. The cache may be implemented using any conventional, sufficiently fast technology, such as by using one or more Flash memory device(s), phase-change random access memory (PRAM), a portion of the main system memory, etc. The cache may also be implemented as a separately packaged, Solid-State Disk (SSD), a circuit card plugged into a bus within the server, as a module on the server motherboard, etc.

Figure 2:
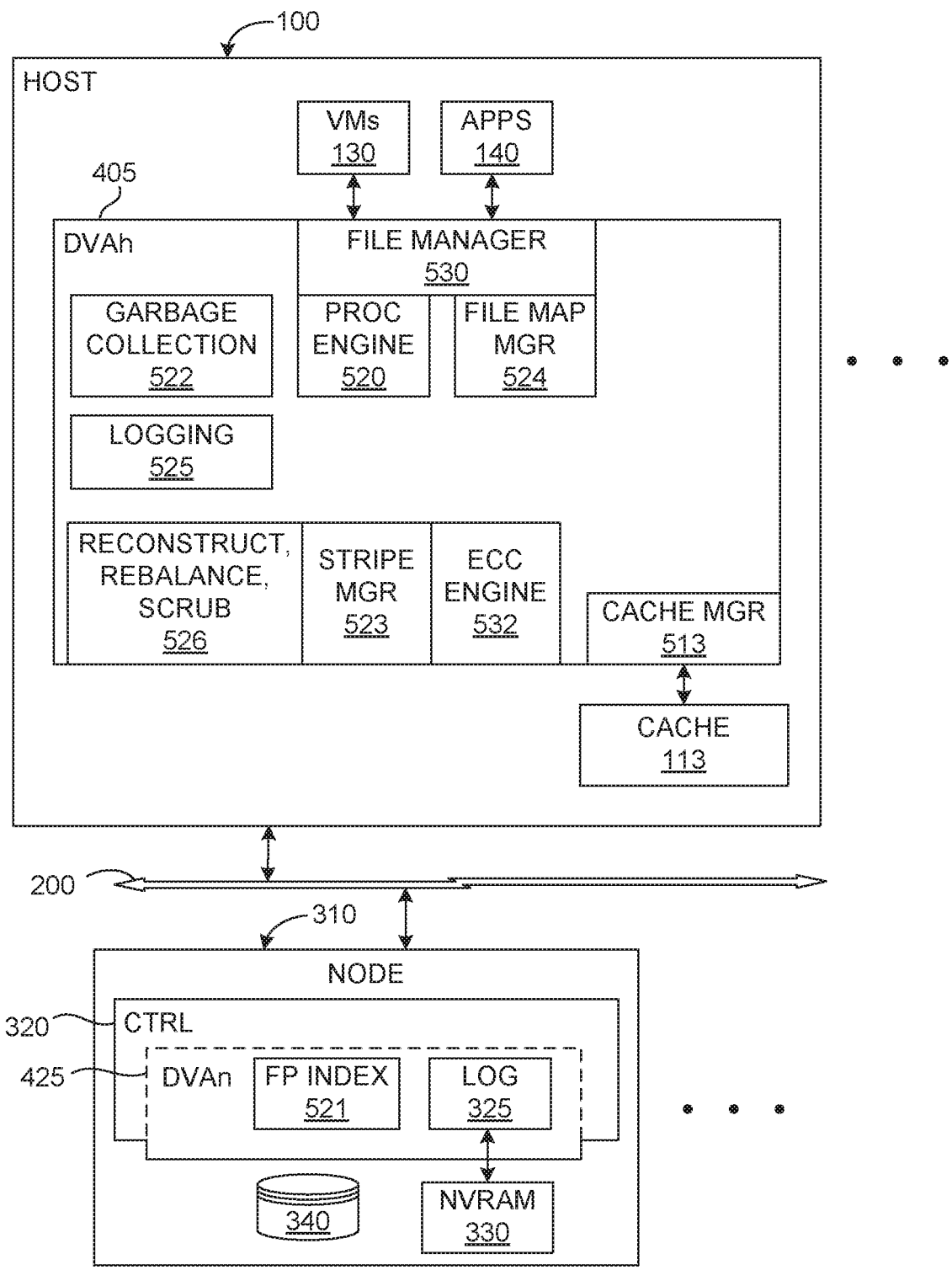
FIG. 2 shows some of the components of the DVA system in greater detail.

FIG. 2 is a simplified representation of the main system components shown in FIG. 1, but with more detail of various optional sub-components of the DVA modules. Although only one host and one node are shown, similar sub-components may be included in other hosts/nodes as well. Note that it will not be necessary for all hosts or nodes to include the same DVA sub-components as the one illustrated in FIG. 2; within any given host, any number (from one to all) of the illustrated sub-components may be included, in any desired combination, depending on the needs of any given implementation. The set of DVA sub-components shown in FIG. 2 is therefore for purposes of illustration and explanation only. Furthermore, although the various sub-components are shown as being separate in FIG. 2, this is for purposes of illustration and explanation only—any or all of them could be combined into unitary bodies of executable code.

The DVA sub-components and their functions perform any or all of various storage processing functions, including background storage management functions, data transformation functions, and/or other functions outlined below. Note that on traditional storage systems, these functions are typically performed within the storage controllers and not in the hosts. The DVAh sub-components preferentially include:

A cache manager 513, which handles reads and writes to the cache 113 using known techniques. In one embodiment, the cache comprises data blocks which have been fingerprinted such that it is possible to find blocks within the cache based on the fingerprint for the block.

A file manager component 530, which receives data from VMs (or other processes, virtualized or not) on the host and processes it to whichever format has been architected for storage in the pool 300. It also receives requests to read data and it retrieves data from the cache or pool, processes it to return it to its originally stored format, and returns the requested data. The file manager may invoke other components to help it cache, process, store, or retrieve data.

The file manager 530 may invoke a mapping module 524, which updates maps from a file offset to a reference to the corresponding data item stored in the pool 300. In some embodiments, that data item reference comprises a fingerprint of a block that includes the data item. In some embodiments, the host computes the fingerprint. In some embodiments, the data item reference comprises a locator for the data item. To satisfy a read request for some offset in a file, the file manager invokes the mapping module 524 to obtain the reference to the data item stored for that offset in the file. It may then use that reference to retrieve the data item from the cache, or, if the data item is not there, it may retrieve the data item from the pool.

As is well known, the storage system of a virtual machine is also virtualized. Processes running on a VM therefore address what they "think" is physical storage, but in fact is a virtual address in a "virtual disk" (vDisk), which then undergoes one or more levels of address redirection using corresponding address maps, leading ultimately to an address in physical space. In the context of a distributed storage system, VM reads and writes are ultimately mapped to the corresponding address in one (or more, for example, if data is mirrored) physical storage devices in the pool 300.

A Data Processing component—the processing engine 520—is preferably included to perform any or all of such known data-transforming functions as compression, encryption, checksums to ensure data integrity, packing of received data into erasure-coded stripes, for example, computing error-correcting code (ECC) values as part of RAID stripes, and/or computing fingerprints, that is, unique identifying information for received data blocks. One example of a possible fingerprinting technique is hashing, such as using any of the SHA methods (for example, SHA-1). Assuming that the chosen fingerprinting method is sufficiently collision resistant (that is, the probability of two different inputs yielding the same fingerprint output is sufficiently low), different data blocks having the same fingerprint may then be presumed to have the same content and therefore be duplicates.

In one embodiment, incoming data is fingerprinted and deduplicated by comparing the fingerprint of the incoming block to the fingerprints of the blocks stored in the cache 113, that is, within the host 100; this avoids the need to analyze and dedupe data stored in the pool 300. Not only does this arrangement allow these computationally intensive tasks to be performed in the usually more powerful host, but it also avoids most of the latency that would otherwise be experienced if the host would first have to retrieve the fingerprint from the more remote storage nodes 310.

A cache of fingerprinted blocks can also avoid the latency of fetching a data block from the pool in response to a read request. Two distinct files may each include a block with the same content and therefore the same fingerprint. The duplicate block may have been inserted in the cache 113 to satisfy a read or write request for one file and a subsequent read request for the duplicate block in another file may be satisfied from the cache without incurring the latency of fetching the block from the pool.

Fingerprinting or checksums may also be used to ensure data integrity and to detect incomplete writes. For example, fingerprints may be computed for buffered data. If there is any indication of possible host failure and incomplete write, the fingerprint of the present data may be compared with that of the buffered data—if the values are not the same, then the system will know the write was incomplete since the buffered data will not be identical to the data intended to be stored.

In a DVA that uses a log-structured filesystem, a garbage collection module 522 may be included to perform conventional garbage collection functions including, in some embodiments, identifying data to be copied forward and, in some embodiments, copying such data into new stripes.

In systems in which data is stored using stripes, a stripe manager 523 may be included. The stripe manager may use or include an ECC engine 532 to compute ECC values, which it adds to a stripe that it distributes across multiple storage nodes according to whatever mapping or allocation scheme that the designer chooses to implement.

A module 526 may also be included in the host to perform such functions as data reconstruction (for example, of missing RAID stripe elements from ECC information), data rebalancing, or data scrubbing to ensure data integrity, etc. This module, or one or more other host modules, may also perform such operations as prefetching data into the host flash cache; forming data clumps and deduping at that granularity and then repacking such clumps, handling host flash failures, updating vDisk maps on the host, etc.

The DVAn sub-components may include:

A fingerprint index 521 to map from fingerprints to data block locators or other identifiers. When a host stores fingerprinted data blocks in stripes and writes the stripes to the pool, it communicates the fingerprints and corresponding data block locators to the fingerprint index. When a host needs to read a fingerprinted block from the pool, it first requests the block locator from the index and then reads the block from the pool. The index 521 may be implemented in the host but is preferably implemented in the controller 320—because the size of the index is proportional to the storage capacity, it will generally be most efficient to bundle the memory for the index with its corresponding storage unit.

A log 325 that receives recently written data and other events from a logging module 525 on a host and stores that data in a non-volatile, low latency NVRAM module 330. The NVRAM module 330 is shown in FIG. 2 as being internal to the node 310, but this is just one implementation example. Other possibilities include putting the NVRAM module 330 within a different, dedicated node, or in any other location. By storing recently written data as a log or otherwise in the NVRAM, the write can be acknowledged as "safe" without incurring the latency of a write to a higher-latency device 340 such as a disk drive. By storing such data external to the host, including the log 325, if the host fails before storing it to a permanent location in one of the storage devices 340, another entity (such as one of storage nodes, one of the hosts that has not failed, or any other entity besides the host that originally received data) can read data from non-volatile device 330 and re-process the data to store it in one of the storage devices 340. This would not be possible if the only copy of the data were internal to the host in a cache 113 that was only accessible via the now-failed host.

One other advantage of including the NVRAM module 330 and exposing it to the hosts via an interface such as LOG 325 is that the host can make the data "safe" by writing it to NVRAM on a storage node allowing quick acknowledgement and then leverage its computing resources for further and possibly delayed storage processing, for example, after enough data is batched to form a stripe, etc. In some embodiments, some of the data written to the NVRAM may never be written to a persistent storage device without further storage processing by host. In some embodiments, the data may be written to multiple NVRAM devices to protect against the failure of one of the NVRAM devices or the controller it is connected to. The host may itself write to multiple NVRAM devices, or a controller may mirror a single host write to multiple NVRAM devices or to a plurality of other controllers and their NVRAM devices either in the same or a different node.

By way of example, assume that a VM wishes to write data to at least one virtualized disk vDisk or file. If the host on which the VM is a guest fails, a copy of the newly written data will survive in the log and NVRAM on some storage node. The Write data may also be buffered in or the file manager or stored in the cache 113 of the VM host until there is enough data to complete some minimum storage unit, such as (for example, in RAID-like systems) a full stripe, before the data is written to the pool, possibly including to one or more storage nodes that did not hold log data for the write. New Write data can also be buffered on the VM host for even longer periods to give time for later overwrites of the same location in a vDisk, which eliminates the need to write out the overwritten data in a stripe. The host—either as part of the DVAh component, or some other host entity, such as in its operating system, may also compute at least one erasure coded block for the Write unit and then write it to a storage node.

If the operation is a READ, the desired data may be looked up in the cache 113. If the data is cached, it may be read from the cache and returned to the requesting process, such as a VM. If the data is not cached, it may be read directly from the storage node (using any intermediate address maps), and returned to the requesting process. The READ data may also be written to the cache.

By concentrating the management and computational burden in the host, the storage nodes can be kept relatively simple, and inexpensive, with no need for dedicated backplanes and fibre channel connections on the storage side; moreover, the entire storage side may communicate with the hosts directly via a standard network connection. Further, if the hosts communicate with the pool, but only infrequently with each other, then one host does not suffer from a noisy neighbor on another host. Finally, if the hosts include a large cache, then they will only infrequently have to contact even nodes in the pool, which further reduces the noisy neighbor problem. Hosts are empowered to serve data to the VMs and applications running within them and so are less susceptible to performance issues elsewhere in the system.

It should be noted that the various functions or processes disclosed herein may be described as data and/or instructions embodied in various non-volatile, computer-readable media, which may be provided as a computer program product to those wishing to implement embodiments of the DVA system.

Figure 3:
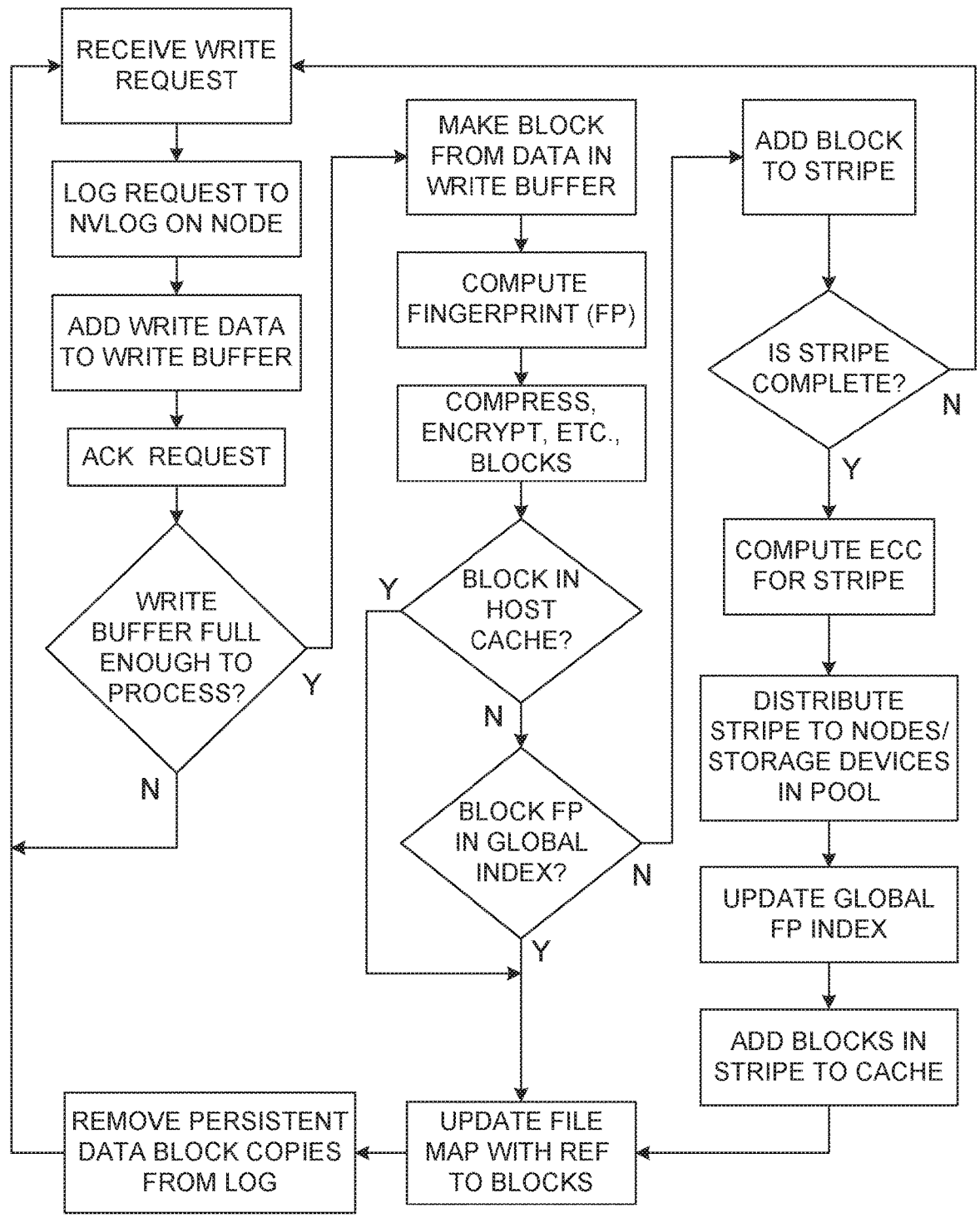
FIG. 3 is a flowchart of one example of workflow upon receipt of write requests.

FIG. 3 illustrates one implementation of processing write requests: When a write request is received, the request is logged to the NVRAM module 330 on a node. Logging the write includes an indication of the file and offset within the file being written. The write data itself is written to the write buffer and the request is acknowledged. If the write buffer is not full enough to trigger processing, for example, enough to form a block, then the processing will return to receive more write requests; otherwise, the written data may be formed into blocks and one or more fingerprints may be computed (depending on whether a single fingerprint is used for the entire data set or separate fingerprints are used per block). Either before, after, or at the same time as the fingerprint computation, the block data may also be processed, such as by compression, encryption, etc. If a given block is already in the host cache (which can be determined by fingerprint comparison), then a file map may be updated with references to the blocks and the processing may return to receive additional writes. If the block's fingerprint is not found in host cache or the global fingerprint index 521, the block is added to the stripe currently being constructed. If the stripe is not yet complete, the system may return to receive additional write requests. If the current stripe is complete, an ECC stripe element is computed for it and it can be distributed for storage. The fingerprints for the blocks in the stripe are then added to the global fingerprint index 521. The blocks can then also be added to the cache, after which, the file map is updated to reference the blocks as stored in the stripe. At this point the written data is safe in the face of a host failure so the temporary copy of the data in the NVRAM is no longer needed. The host, using, for example, the logging module 525, may therefore communicate to the log 325 that it may truncate the data and remove it from the NVRAM. Note that the controller need not itself rewrite the data temporarily stored in NVRAM in a more permanent location. Finally, processing returns to receive additional writes. In other embodiments, the DVAh components compute a fingerprint and check for presence of that fingerprint in the host cache and/or global fingerprint index and, for the corresponding file and offset within the file, log to the remote NVRAM only a new reference to previously stored data instead of the data itself before acknowledging the write.

Figure 4:
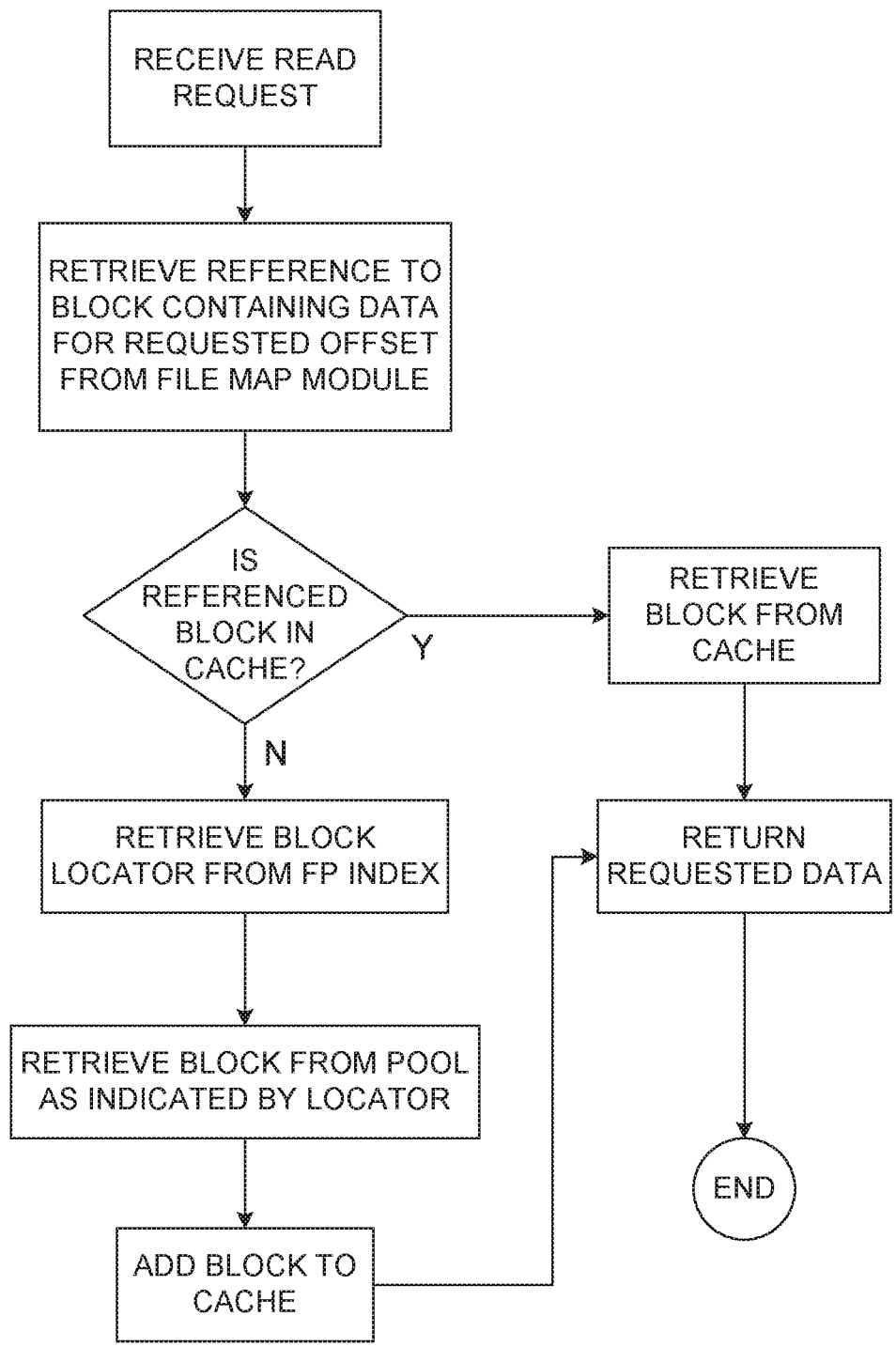
FIG. 4 is a flowchart of one example of workflow upon receipt of read requests.

FIG. 4 illustrates one implementation of processing read requests: A read request is received and the reference to the block containing the data is retrieved from file map module, which will provide the requested offset. If the referenced block is in the cache 113, it may be retrieved and the data can be returned to fulfill the read request. If the block is not in the cache, it must be retrieved from the pool. This can be achieved by retrieving the block locator from the fingerprint index. Once the block is retrieved, it may be added to the cache, and the requested data may be returned.

What is claimed is:

1. A data storage system comprising:
a plurality of host servers, each of which includes at least one processor;
wherein the plurality of host servers includes a particular host server;
wherein the particular host server communicates with a plurality of storage nodes over at least one network,
wherein the plurality of storage nodes includes:
a first storage node with at least one persistent storage device; and
a second storage node with a non-volatile memory;
wherein the at least one persistent storage device has higher latency than the non-volatile memory;
wherein the particular host server:
is executing at least one process that issues data storage read/write requests;
includes a system software component configured to write data, corresponding to a write request from the at least one process, at least twice, including:
writing the data, in a first write operation from the particular host server to the non-volatile memory within the second storage node without involving any persistent storage devices of the plurality of storage nodes, and
writing the data, in a second write operation from the particular host server to at least one persistent storage device of at least one storage node of the plurality of storage nodes, without involving the non-volatile memory within the second storage node,
said non-volatile memory thereby forming a temporary, back-up data storage system to avoid losing data before the data is written to at least one persistent storage device; and
performs at least one storage processing function.

2. The system of claim 1, in which the at least one storage processing function comprises:
computing a fingerprint of data written; and
storing the fingerprinted data in a selected one of the plurality of storage nodes.

3. The system of claim 1, in which the at least one storage processing function includes compressing data to be written and sending the data in compressed form for storage in at least one of the plurality of storage nodes.

4. The system of claim 1, in which the at least one storage processing function includes computing error-correction data over the data to be written and storing both the data to be written and the computed error-correction in at least one of the plurality of storage nodes.

5. The system of claim 1, in which the at least one storage processing function includes deduplicating data already stored in the plurality of storage nodes.

6. The system of claim 1, in which the at least one storage processing function includes performing garbage collection on stored data.

7. The system of claim 1, in which the at least one storage processing function includes logging data writes and transmitting corresponding logging information to a log within at least one of the plurality of storage nodes.

8. The system of claim 1, in which the at least one storage processing function includes data reconstruction.

9. The system of claim 1, in which the at least one storage processing function includes data rebalancing.

10. The system of claim 1, in which the at least one storage processing function includes data scrubbing.

11. The system of claim 1, in which the particular host server is configured to cause the data written in the first write operation to be deleted after the particular host server performs the second write operation.

12. The system of claim 1, in which the system software component acknowledges completion of the write request before completion of the second write operation.

13. The system of claim 1, in which the second write operation comprises:
writing data to one or more remote, non-volatile memory devices separate from the particular host server,
computing error-correcting code ("ECC") codes for the data, and
writing the ECC data to a different persistent storage device.

14. The system of claim 1, in which the system software component is configured to acknowledge a new write and to subsequently carry out the at least one storage processing function.

15. The system of claim 1, in which the at least one storage processing function includes data encryption.

16. A data storage system comprising:
a plurality of host servers, each of which includes at least one processor;
wherein the plurality of host servers includes a particular host server;
wherein the particular host server communicates with a plurality of storage nodes over at least one network,
wherein the plurality of storage nodes comprises at least:
a first storage node with at least one persistent storage device and a non-volatile memory; and
a second storage node with at least one persistent storage device and a non-volatile memory;
wherein the at least one persistent storage device has higher latency than the non-volatile memory;
wherein the particular host server:
is executing at least one process that issues data storage read/write requests;
includes a system software component configured to write the data corresponding to the write requests at least twice for each write request, including:
writing the data, in a first write operation from the particular host server to the non-volatile memory within at least one storage node without involving any persistent storage devices of the plurality of storage nodes, and
writing the data, in a second write operation from the particular host server to at least one persistent storage device of at least one storage node of the plurality of storage nodes, without involving the non-volatile memory within at least one storage node,
said non-volatile memory thereby forming a temporary, back-up data storage system to avoid losing data before the data is written to at least one persistent storage device; and
performs at least one storage processing function.

17. A method comprising:
receiving a write request from a process executing on a particular host server;
wherein the particular host server communicates with a plurality of storage nodes over at least one network,
wherein the plurality of storage nodes includes:
a first storage node with at least one persistent storage device; and a second storage node with a non-volatile memory;
wherein the at least one persistent storage device has higher latency than the non-volatile memory;
executing, on the particular host server, a system software component; and
in response to the write request, the system software component writes data, at least twice, including:
writing the data, in a first write operation from the particular host server to the non-volatile memory within the second storage node without involving any persistent storage devices of the plurality of storage nodes, and
writing the data, in a second write operation from the particular host server to at least one persistent storage device of at least one storage node of the plurality of storage nodes, without involving the non-volatile memory within the second storage node,
said non-volatile memory thereby forming a temporary, back-up data storage system to avoid losing data before the data is written to at least one persistent storage device.

18. The method of claim 17, wherein the system software component acknowledges completion of the write request before completion of the second write operation.

19. The method of claim 17, wherein the second write operation comprises:
writing data to one or more persistent storage devices on one or more of the plurality of nodes,
computing error-correcting code ("ECC") codes for the data, and
writing the ECC codes to a different persistent storage device.

* * * * *